(12) United States Patent
Ghiasi (10) Patent No.: US 9,647,859 B2
(45) Date of Patent: May 9, 2017

(54) SYSTEM AND METHOD FOR LINK TRAINING OF A BACKPLANE PHYSICAL LAYER DEVICE OPERATING IN SIMPLEX MODE

(71) Applicant: Avago Technologies General IP (Singapore) Pte. Ltd., Singapore (SG)

(72) Inventor: Ali Ghiasi, Cupertino, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 30 days.

(21) Appl. No.: 13/852,398

(22) Filed: Mar. 28, 2013

(65) Prior Publication Data

US 2014/0241411 A1    Aug. 28, 2014

Related U.S. Application Data

(60) Provisional application No. 61/767,864, filed on Feb. 22, 2013.

(51) Int. Cl.
*H04L 25/03* (2006.01)
*H04L 25/49* (2006.01)

(52) U.S. Cl.
CPC .... *H04L 25/03878* (2013.01); *H04L 25/4904* (2013.01)

(58) Field of Classification Search
CPC .............. H04L 12/40136; H04L 12/66; H04L 25/03878; H04L 25/4904

USPC ........ 375/219, 231; 370/277, 470, 510, 536; 714/752, 776

See application file for complete search history.

(56) References Cited

U.S. PATENT DOCUMENTS

| | | | | |
|---|---|---|---|---|
| 8,307,265 | B2 * | 11/2012 | Ganga | H03M 13/05 370/470 |
| 2006/0067387 | A1 * | 3/2006 | Ahmed | H04B 10/0779 375/219 |
| 2009/0219978 | A1 * | 9/2009 | Mobin | H04L 25/03006 375/219 |
| 2012/0327818 | A1 * | 12/2012 | Takatori | H04L 5/14 370/277 |
| 2013/0156086 | A1 * | 6/2013 | Ahmed | H04L 27/01 375/231 |

* cited by examiner

*Primary Examiner* — Chieh M Fan
*Assistant Examiner* — Eboni Hughes
(74) *Attorney, Agent, or Firm* — Foley & Lardner LLP (57) ABSTRACT

A system and method for link training of a backplane physical layer device operating in simplex mode. In one embodiment of the present invention, a backplane training system includes a backplane device coupled to a first end of a backplane and at least one retimer device at a second end of the backplane. During a training process, a receiving device is configured to forward a training frame (e.g., DME frame) to a second device for use by a transmitter in the second device.

12 Claims, 8 Drawing Sheets

FIG. 1

| BYTES | |
|---|---|
| 4 | FRAME MARKER |
| 16 | TX FFE COEFF UPDATE |
| 16 | STATUS REPORT |
| 512 | TRAINING PATTERN |

SYSTEM AND METHOD FOR LINK TRAINING OF A BACKPLANE PHYSICAL LAYER DEVICE OPERATING IN SIMPLEX MODE

This application claims priority to provisional application No. 61/767,864, filed Feb. 22, 2013, which is incorporated herein by reference in its entirety.

BACKGROUND

Field of the Invention

The present invention relates generally to networking and, more particularly, to a system and method for link training of a backplane physical layer device operating in simplex mode.

Introduction

Data communication networks continue to expand in reach and capacity. The continual evolution of data communication networks presents continuing challenges in coordinating the transport of various forms of network traffic from various sources. Today's networks encompass vast computing data centers in an enterprise environment. Within such an environment, a substantial amount of data traffic is carried over backplane devices in chassis-based systems. Challenges continue to arise in ensuring the reliability of communication as transmission data rates continue to increase in accordance with next generation transmission technologies.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Training of backplane physical layer devices (PHYs) is based on an exchange of training frames. In some backplane or front panel applications, the transmit PHY/retimer physical location may not be the same as the receive PHY/retimer location due to signal integrity and/or board constraints.

In one embodiment of the present invention, a backplane training system includes a backplane device coupled to a first end of a backplane and a first and a second retimer device at a second end of the backplane. The backplane device includes a first transmitter and a first receiver, the first retimer device includes a second transmitter that communicates with the first receiver via the backplane, and the second retimer device includes a second receiver that communicates with the first transmitter via the backplane. During a training process, the first retimer device is configured to forward a training frame (e.g., Differential Manchester Encoding (DME) frame) that is received by the second receiver from the first transmitter to the first retimer device for training of the second transmitter.

In one example, the training frame is forwarded from the second retimer device to the first retimer device via an out-of-band channel. In another example, the training frame is forwarded from the second retimer device to the first retimer device via a backplane device (e.g., switch).

In another embodiment of the present invention applied to a simplex mode, a backplane training system includes a backplane device coupled to a first end of a backplane and a single retimer device at a second end of the backplane. In this embodiment, a training frame is received by a receiver in a PHY/retimer device, the received training frame is then transmitted by a transmitter in the PHY/retimer device to a device that is external to the PHY/retimer device. The forwarded training frame is designed to train a second transmitter that is contained within the device that is external to the PHY/retimer device, wherein the second transmitter communicates with a second receiver in the backplane device.

In one embodiment, the forwarding of the received training frame is based on a determination of whether or not the training frame is to be used by the transmitter in the receiving PHY/retimer device. In one example, the determination is based on a value of a frame marker in the received training frame.

Figure 1:
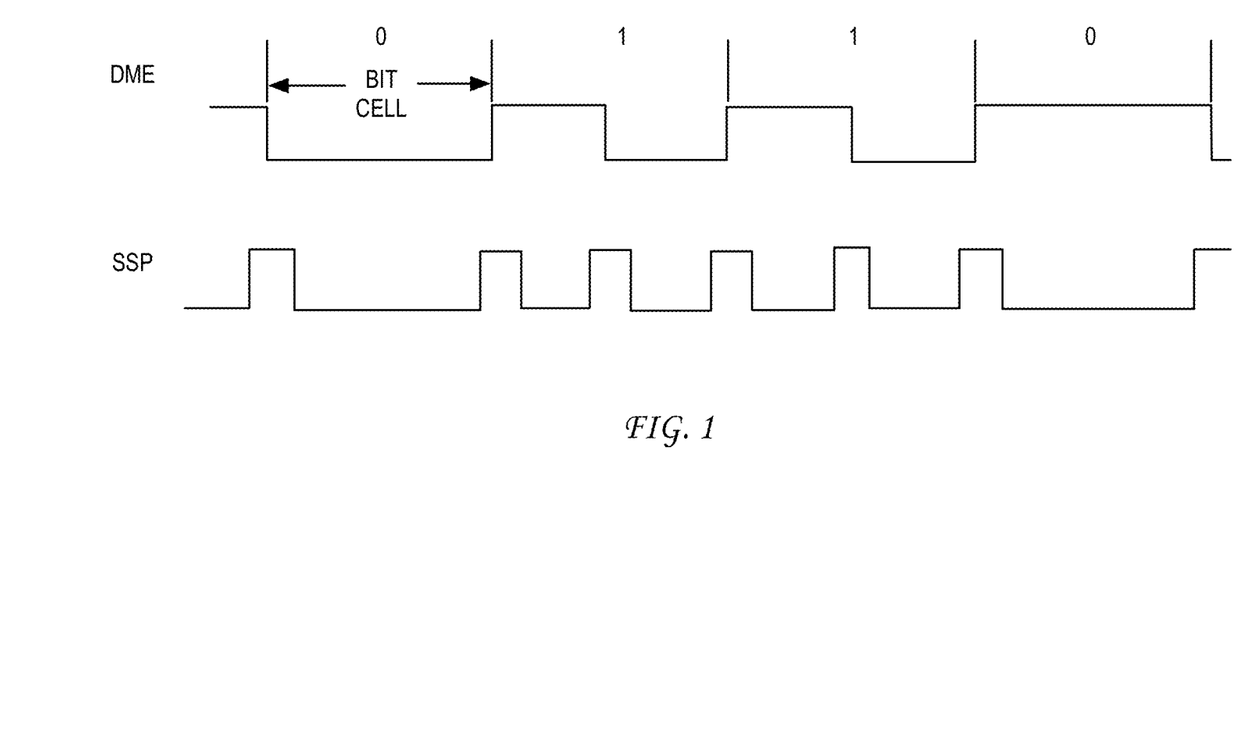
FIG. 1 illustrates an example of Differential Manchester Encoding (DME) and an equivalent Symbol Sequence Pulse (SSP) signal.

Transmitter training of backplane devices is based on a training frame that is exchanged across a backplane. In one example, the training frame is a DME frame. FIG. 1 illustrates an example of DME and an equivalent Symbol Sequence Pulse (SSP) signal. In one example, the DME training frame operates at 312.5 Mbaud or with a 6.4 ns clock cycle. One symbol is equivalent to 33 symbols at 10.3125 Gbaud. As illustrated in FIG. 1, the encoding rules provide for a transition on each bit cell edge, a transition at a bit cell center for a 1, and no transition at a bit cell center for a 0. FIG. 1 further illustrates the equivalent SSP signal.

Figure 2:
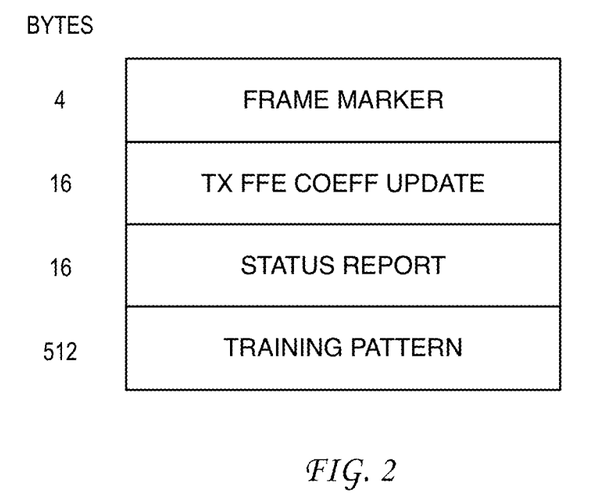
FIG. 2 illustrates an example of a training frame.

FIG. 2 illustrates an example of a training frame sent at 10.3125 Gbaud. As illustrated, the training frame is 548 bytes in length. The frame starts with a 4-byte frame marker (e.g., 0xFFFF0000), followed by a 16-byte transmitter feed-forward equalizer (FFE) coefficient update, a 16-byte status report, and a 512-byte training pattern based on pseudorandom binary sequence (PRBS) 11 with 1 extra bit appended. As would be appreciated, the principles of the present invention are not dependent on the particular structure or rate of the training frame.

Figure 3A:
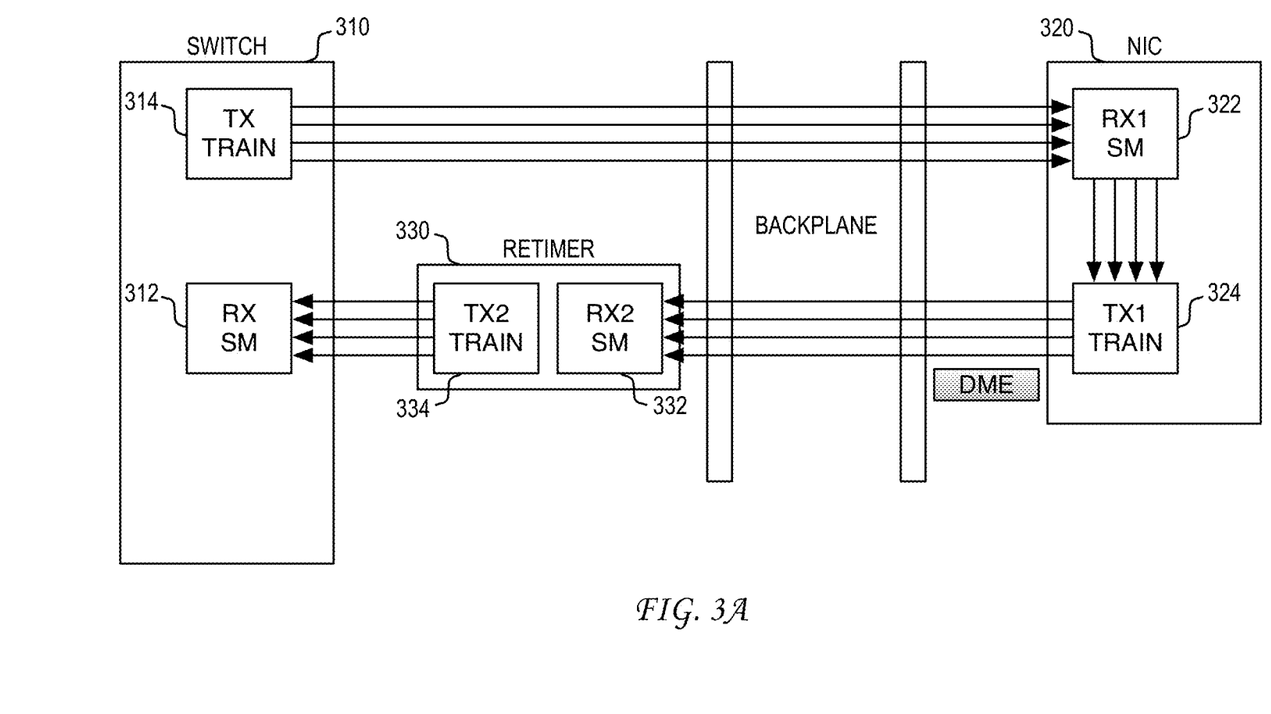
FIGS. 3A and 3B illustrate a first example embodiment of training in a backplane application having a single simplex retimer device.

A training frame such as that illustrated in FIG. 2, can be used in the context of a backplane application having a single simplex retimer device such as that illustrated in FIG. 3A. As illustrated, a backplane is used to facilitate an example connection between switch 310 and network interface card (NIC) 320. In this example, simplex retimer device 330 is placed upstream from NIC 320.

In this illustrated application, the potential for "miss-training" exists. Consider, for example, a desire to train the downstream link between transmitter 314 in switch 310 and receiver 322 in NIC 320. To facilitate this training, the DME request is generated by receiver state machine 322 to adjust the FFE of transmitter 314 in switch 310. In response to this DME request, the DME training frame is then transmitted by transmitter 324 in NIC 320 and is received by receiver 332 in retimer 330. This received DME training frame can be used by retimer 330 to train transmitter 334 in retimer 330 instead of transmitter 314 in switch 310. In effect, the link between transmitter 334 in retimer 330 and receiver 312 in switch 310 is "miss-trained", while the link between transmitter 314 in switch 310 and receiver 322 in NIC 320 is not trained.

Figure 3B:
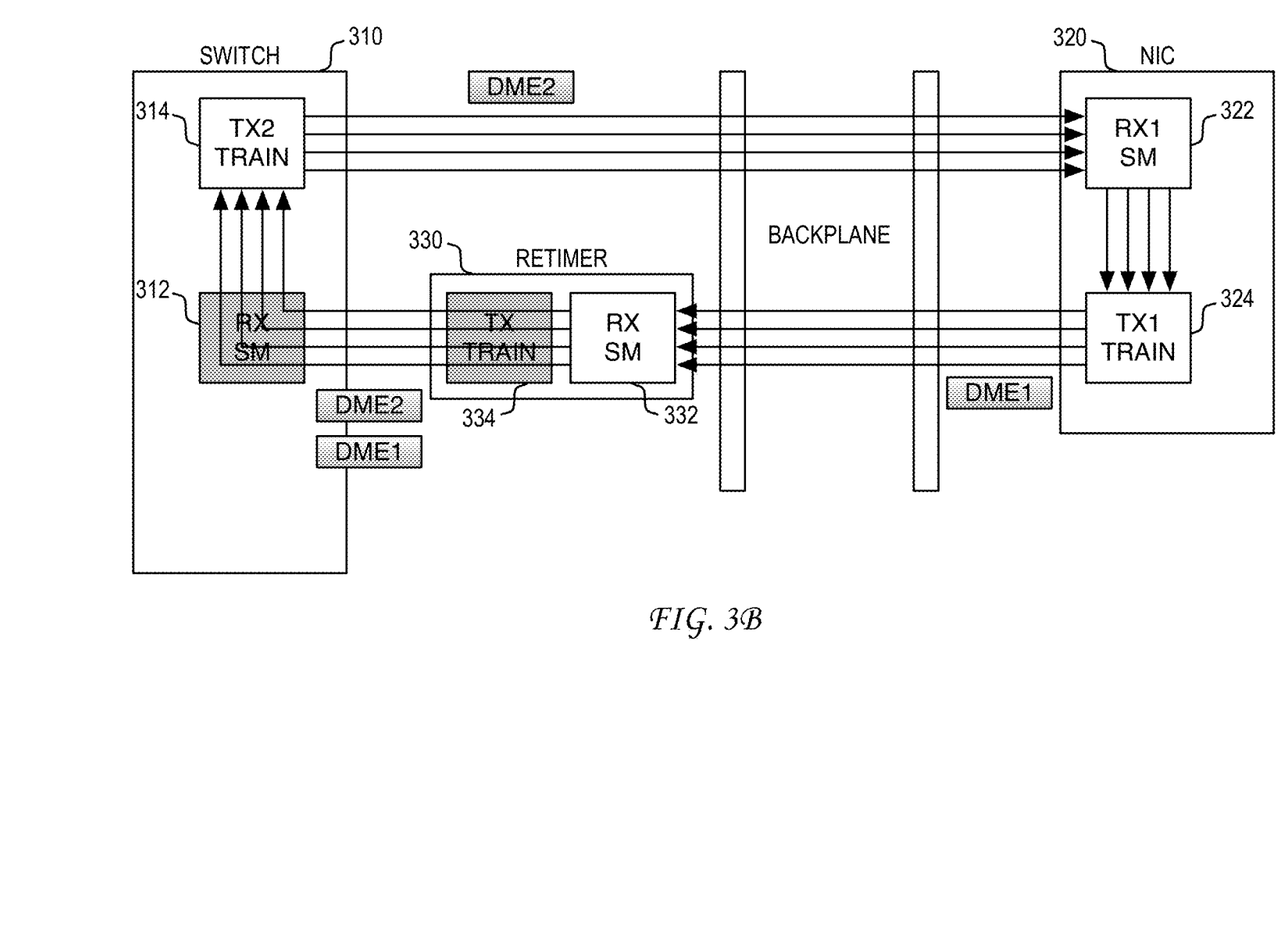

It is a feature of the present invention that such "miss-training" can be prevented. FIG. 3B illustrates an example embodiment of training in a backplane application having a single simplex retimer device that prevents such "miss-training". To facilitate proper training, transmitter 334 of retimer 330 and receiver 312 of switch 310 effectively operate in a bypass mode. In one embodiment, the link between transmitter 334 in retimer 330 and receiver 312 in switch 310 is locally managed.

With transmitter 334 in retimer 330 and receiver 312 in switch 310 effectively operating in a bypass mode, the link between transmitter 314 in switch 310 and receiver 322 in NIC 320 can be properly trained. To facilitate this training, the DME request is generated by receiver state machine 322 to adjust the FFE of transmitter 314 in switch 310. In response to this request, the DME1 training frame is then transmitted by transmitter 324 in NIC 320 and is received by receiver 332 in retimer 330. As transmitter 334 in retimer 330 effectively operates in a bypass mode, the DME1 training frame passes through retimer 330 for use by transmitter 314 in switch 310. The link between transmitter 314 in switch 310 and receiver 322 in NIC 320 can then be properly trained. In one embodiment, receiver 332 in retimer 330 detects the DME1 training frame, bypasses the decision feedback equalizer (DFE) and lets the training frame go through the clock and data recovery (CDR).

In a similar manner, the link between transmitter 324 in NIC 320 and receiver 332 in retimer 330 can also be properly trained. To facilitate this training, the DME request is generated by receiver state machine 332 in retimer 330 to adjust the FFE of transmitter 324 in NIC 320. In response to such a request, the DME2 training frame is then transmitted by transmitter 334 in retimer 330 and is received by receiver 312 in switch 310. As receiver 312 in switch 310 effectively operates in a bypass mode, the DME2 training frame passes through switch 310 and is eventually received by receiver 322 in NIC 320. The link between transmitter 324 in NIC 320 and receiver 332 in retimer 330 can then be properly trained.

To facilitate the proper training scenarios described above, retimer 330 can be configured to multiplex the locally-generated DME2 training frame with the remotely-generated DME1 training frame. As illustrated in FIG. 3B, the link from transmitter 334 in retimer 330 to receiver 312 in switch 310 would carry the locally-generated DME1 training frame that switch 310 would pass through to NIC 320 for training of transmitter 324, as well as the remotely-generated DME1 training frame that retimer 330 would pass through to switch 310 for the training of transmitter 314.

Figure 4:
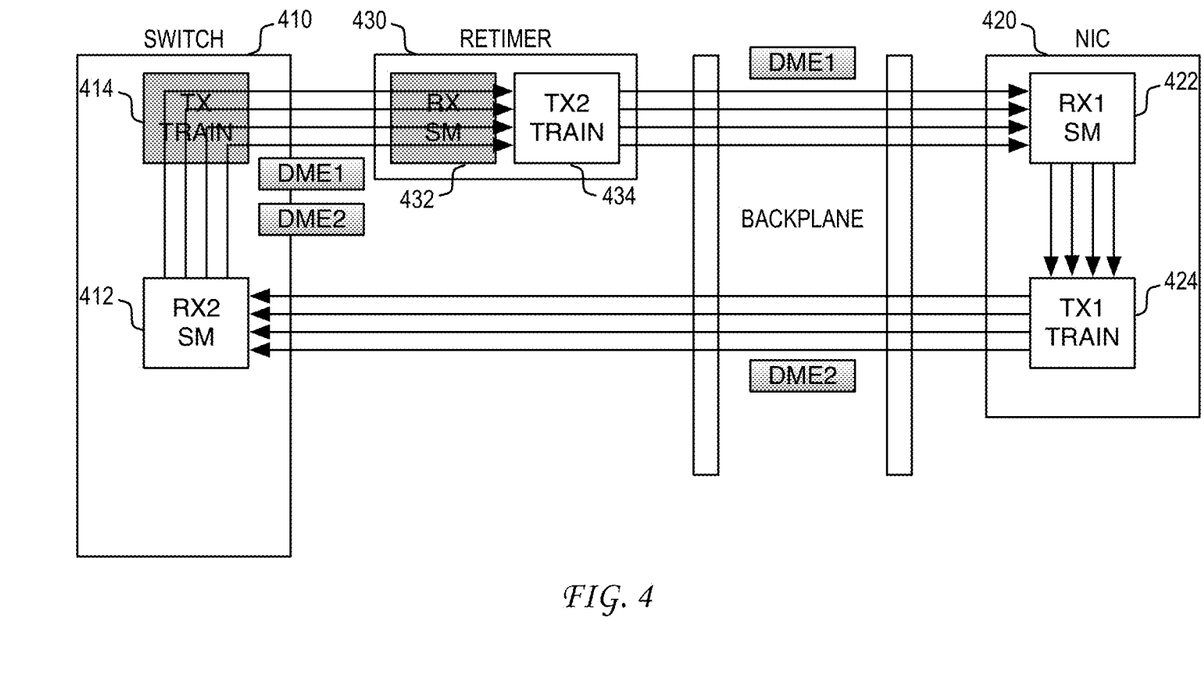
FIG. 4 illustrates a second example embodiment of training in a backplane application having a single simplex retimer device.

FIG. 4 illustrates another example embodiment of training in a backplane application having a single simplex retimer device that prevents such "miss-training". As illustrated, a backplane is used to facilitate a connection between switch 410 and NIC 420. In this example, simplex retimer device 430 is placed downstream from switch 410.

In this illustrated application, the potential for "miss-training" again exists. Consider, for example, a desire to train the upstream link between transmitter 424 in NIC 420 and receiver 412 in switch 410. To facilitate this training, the DME request is generated by receiver state machine 412 to adjust the FFE of transmitter 424 in NIC 420. In response to this DME request, the DME training frame would then be transmitted by transmitter 414 in switch 410 and is received by receiver 432 in retimer 430. This received DME training frame can be used by retimer 430 to train transmitter 434 in retimer 330 instead of transmitter 424 in NIC 420. In effect, the link between transmitter 434 in retimer 430 and receiver 422 in NIC 420 is "miss-trained", while the link between transmitter 424 in NIC 420 and receiver 412 in switch 410 is not trained.

To facilitate proper training, transmitter 414 of switch 410 and receiver 432 of retimer 430 effectively operate in a bypass mode. In one embodiment, the link between transmitter 414 in switch 410 and receiver 432 in retimer 430 is locally managed.

With transmitter 414 of switch 410 and receiver 432 of retimer 430 effectively operating in a bypass mode, the link between transmitter 424 in NIC 420 and receiver 412 in switch 410 can be properly trained. To facilitate this training, the DME request is generated by receiver state machine 412 to adjust the FFE of transmitter 424 in NIC 420. In response to this request, the DME1 training frame is then transmitted by transmitter 414 in switch 410 and is received by receiver 432 in retimer 430. As receiver 432 in retimer 430 effectively operates in a bypass mode, the DME1 training frame passes through retimer 430 for use by transmitter 424 in NIC 420. The link between transmitter 424 in NIC 420 and receiver 412 in switch 410 can then be properly trained.

In a similar manner, the training of the link between transmitter 434 in retimer 430 and receiver 422 in NIC 420 can also be properly trained. To facilitate this training, the DME request is generated by receiver state machine 422 in NIC 420 to adjust the FFE of transmitter 434 in retimer 430. In response to this request, the DME2 training frame is then transmitted by transmitter 424 in NIC 420 and is received by receiver 412 in switch 410. As transmitter 414 in switch 410 effectively operates in a bypass mode, the DME2 training frame passes through switch 410 and is eventually received by receiver 432 in retimer 430. The link between transmitter 434 in retimer 430 and receiver 422 in NIC 420 can then be properly trained.

To facilitate the proper training described above, switch 410 is configured to multiplex the locally-generated DME1 training frame with the remotely-generated DME2 training frame. As illustrated, the link from switch 410 to retimer 430 would carry the locally-generated DME1 training frame that retimer 430 would pass through to NIC 420 for training of transmitter 424, as well as the remotely-generated DME2 training frame that switch 410 would pass through to retimer 430 to control the training of transmitter 434.

Figure 5:
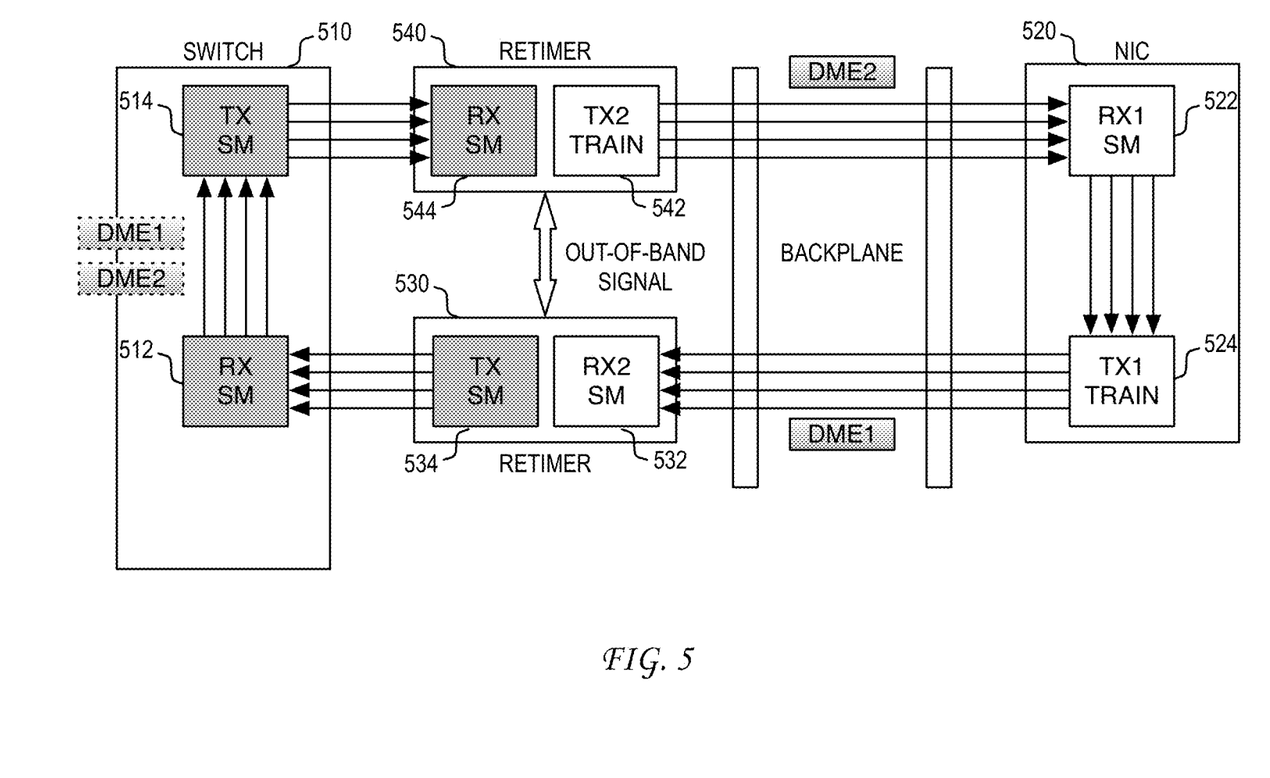
FIG. 5 illustrates an example embodiment of training in a backplane application having two retimer devices.

In addition to the proper training of single-retimer embodiments such as the examples described above, the principles of the present invention can also be applied to backplane applications having two retimer devices. FIG. 5 illustrates an example configuration having two retimer devices in both upstream and downstream directions. As illustrated, a backplane is used to facilitate a connection between switch 510 and NIC 520. This connection includes a placement of retimer device 530 in an up-stream link between NIC 520 and switch 510 and a placement of retimer device 540 in a down-stream link between switch 510 and NIC 520. In this configuration, the potential for "miss-training" again exists. For example, the receipt of the DME1 training frame by receiver 532 in retimer 530 would lead to the "miss-training" of the link between transmitter 534 in retimer 530 and receiver 512 in switch 510.

In one embodiment, such "miss-training" can be avoided through the provision of an out-of-band communication path between retimer 530 and retimer 540. In a scenario where the link between transmitter 542 in retimer 540 and receiver 522 in NIC 520 is desired to be trained, a DME request is generated by receiver state machine 522 in NIC 520 to adjust the FFE of transmitter 542 in retimer 540. In response to this request, the DME1 training frame is then transmitted by transmitter 524 in NIC 520 and is received by receiver 532 in retimer 530. To facilitate the training of transmitter 542 in retimer 540, DME information based on the DME1 training frame can then be transmitted from retimer 530 to retimer 540 as an out-of-band signal. The receipt of the DME information as an out-of-band signal by retimer 540 would then enable transmitter 542 in retimer 540 to be trained.

In one embodiment, the out-of-band signal can be facilitated by a set of hardware pins. In another embodiment, the out-of-band signal can be facilitated by a Management Data Input/Output (MDIO) interface or other management modules.

In a similar manner, an out-of-band signal can be used to facilitate training of the link between transmitter 524 in NIC 520 and receiver 532 in retimer 530. Here, a DME request is generated by receiver state machine 532 in NIC 530 to adjust the FFE of transmitter 524 in NIC 520. The DME request is then passed to transmitter 542 in retimer 540 as an out-of-band signal. Transmitter 542 in retimer 540 can then transmit the DME2 training frame to receiver 522 in NIC 520 for use in the training of transmitter 524.

As has been described, the training of the link between transmitter 524 in NIC 520 and receiver 532 in retimer 530 as well as the training of the link between transmitter 542 in retimer 540 and receiver 522 in NIC 520 is not reliant on the operation of transmitter 514 and receiver 512 in switch 510, transmitter 534 in retimer 530, and receiver 544 in retimer 540.

In one embodiment, DME training information can be passed through those elements in a bypass mode in a manner similar to that described above with reference to FIGS. 3B and 4. More specifically, for training of the link between transmitter 542 in retimer 540 and receiver 522 in NIC 520, the remotely-generated DME1 training frame can be forwarded from retimer 530 to retimer 540 via switch 510. For training of the link between transmitter 524 in NIC 520 and receiver 532 in retimer 530, the locally-generated DME2 training frame can be forwarded from retimer 530 to retimer 540 via switch 510.

Figure 6:
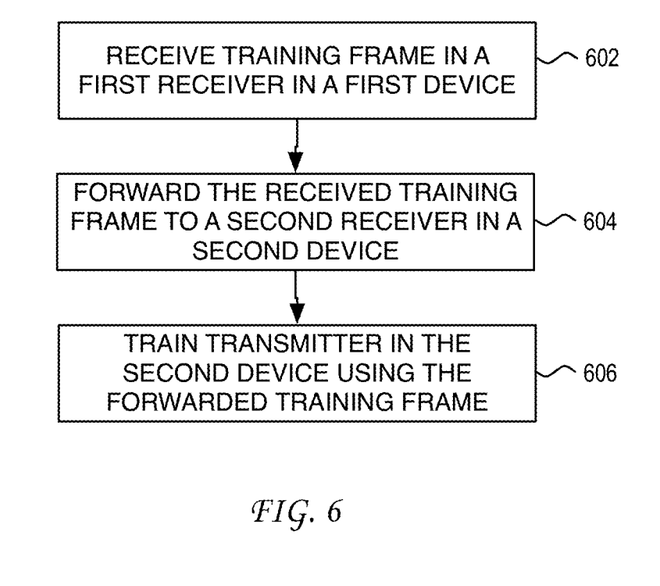
FIG. 6 illustrates an example process of the present invention.

Having described a framework of operation of link training of a backplane physical layer device operating in simplex mode, reference is now made to the flowchart of FIG. 6, which illustrates an example process of the present invention. As illustrated, the process begins at step 602, where a training frame is received in a first receiver of a first device. While the first device may be a retimer device, a switch, or the like, the training frame is received via a backplane from a first transmitter in a backplane device.

Next, at step 604, the received training frame is forwarded by a transmitter in the first device to a second receiver in a second device. In one example, the forwarding is performed by a retimer device to a switch device. In another example, the forwarding is performed by a switch device to a retimer device. In general, the forwarding can represent a process by which the first device recognizes that the training frame is not to be used to train the transmitter in the first device, but rather to train a transmitter in a second device external to the first device.

Figure 7:
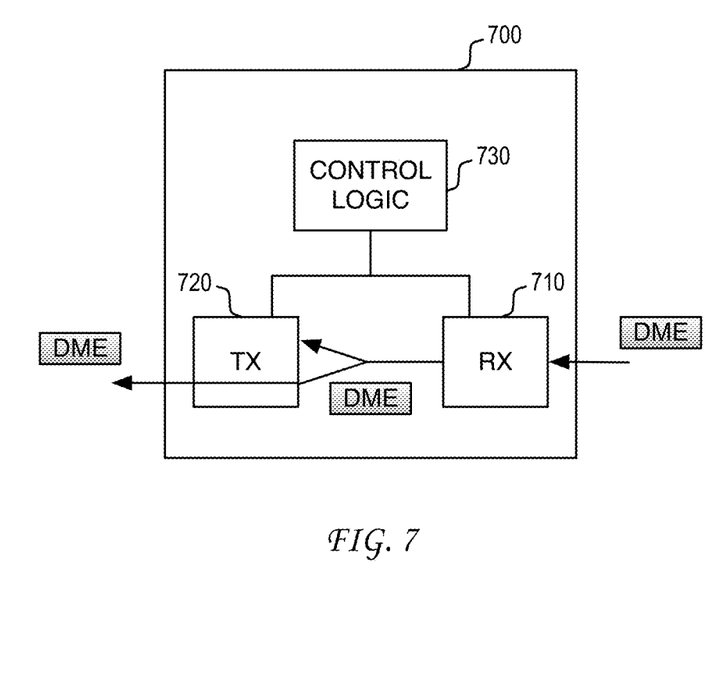
FIG. 7 illustrates an example embodiment of a device that receives a training frame.

FIG. 7 illustrates a high-level overview of a device that can process a training frame that is received. As illustrated, device 700 includes receiver 710, which is configured to receive a training frame. Where device 700 is operating in an environment that includes simplex devices such as retimers, the training frame may not be designed to train transmitter 720 in device 700. Rather, the training frame may be designed to train a second transmitter in a second device that is external to device 700. As illustrated, device 700 further includes control logic 730 that can be designed to determine whether or not the training frame should be forwarded to a second device.

In one example, the determination of the control logic can be based on a value of a frame marker of the training frame. For example, a frame marker of 0xFFFF0000 can be used to instruct control logic 730 to perform a first action (e.g., use the training frame to train transmitter 720), while a frame marker of 0x0000FFFF can be used to instruct control logic 730 to perform a second action (e.g., forwarding of training frame to train a transmitter in a second device) different from the first action. As would be appreciated the particular mechanism by which control logic 730 makes a decision of whether or not to operate in a bypass mode would be implementation dependent. Any mechanism that can facilitate an a priori or real-time determination by control logic 730 can be used.

Returning to the flowchart of FIG. 6, the forwarding of a training frame at step 604 prevents "miss-training" of a link. Thus, at step 606, the forwarded training frame is used by a second transmitter in a second device using the forwarded training frame. In general, the forwarding process can be used by one or more devices. What is significant is that the forwarding process can be used to ensure that the training frame arrives at the proper device to facilitate training of the correct transmitter. As has been described, the forwarding can be based on in-band as well as out-of-band communication.

It should be noted that the principles of the present invention can be applied to various backplane technologies in supporting KR, KR4, and CR4 operation. As would be appreciated, the principles of the present invention are not limited to a specific link rate, type of training frame, or a particular combination of devices.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A system, comprising:
a backplane;
a first device coupled to the backplane, the first device having a first transmitter and a first receiver;
a second device, the second device having a second receiver and a second transmitter, the second transmitter communicating with the first receiver via the backplane; and
a third device, the third device having a third receiver and a third transmitter and control logic, the third receiver communicating with the first transmitter via the backplane, wherein the third device is configured to:
receive, at the third receiver, a training frame transmitted by the first transmitter of the first device,
determine, via the control logic, that the training frame is not intended to train the third transmitter of the third device, and
forward the training frame to the second device, by the third transmitter, responsive to the determination.

2. The system of claim 1, wherein the training frame is a differential Manchester encoding frame.

3. The system of claim 1, wherein the training frame is forwarded from the third device to the second device via an out-of-band channel.

4. The system of claim 1, wherein the training frame is forwarded from the third device to the second device via a switch.

5. A method, comprising:
receiving, by a first receiver in a first device, a training frame directly from a third transmitter in a backplane device, the first device also including a first transmitter; and
forwarding the training frame from the first transmitter to a second device external to the first device, responsive to a determination by control logic of the first device that the training frame is not intended to train the first transmitter, the forwarded training frame used to train a second transmitter in the second device that communicates directly with a third receiver in the backplane device.

6. The method of claim 5, wherein the training frame is a differential Manchester encoding frame.

7. The method of claim 5, wherein the first device is a retimer device.

8. The method of claim 7, wherein the second transmitter is in a switch that communicates with the third receiver in the backplane device.

9. The method of claim 8, wherein the forwarding comprises forwarding the training frame to a second receiver in the switch, wherein the switch is configured to forward the training frame from the second receiver to the second transmitter in the switch.

10. The method of claim 5, wherein the first device is in a switch.

11. The method of claim 10, wherein the second transmitter is in a retimer device that communicates with the third receiver in the backplane device.

12. The method of claim 11, wherein the forwarding comprises forwarding the training frame to a second transmitter in the retimer device, wherein the switch is configured to forward the training frame from the first transmitter to the retimer device.

* * * * *